United States Patent
Kobayashi et al.

(10) Patent No.: US 7,675,013 B2
(45) Date of Patent: Mar. 9, 2010

(54) IMAGE DISPLAYING APPARATUS WITH CONTROL OVER THE OUTPUT RATIO OF A PLURALITY OF LIGHT SOURCES

(75) Inventors: Shuichi Kobayashi, Yokohama (JP); Keiichiro Ishihara, Yokohama (JP); Yashuhiro Soeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/429,608

(22) Filed: May 5, 2006

(65) Prior Publication Data

US 2006/0255243 A1    Nov. 16, 2006

(30) Foreign Application Priority Data

May 12, 2005    (JP)    .............................. 2005-139752

(51) Int. Cl.
*G01J 1/32*    (2006.01)
(52) U.S. Cl. .................... 250/205; 250/204; 359/204.4; 359/618; 359/629
(58) Field of Classification Search ................. 250/204, 250/205, 208.1; 359/201, 202, 204, 618, 359/629, 201.1, 201.2, 202.1, 204.4; 345/213
See application file for complete search history.

(56) References Cited

U.S. PATENT DOCUMENTS

| | | | | |
|---|---|---|---|---|
| 4,072,858 A | * | 2/1978 | Stone | ......................... 250/205 |
| 4,689,482 A | * | 8/1987 | Horikawa et al. | ........... 250/205 |
| 5,600,126 A | * | 2/1997 | Appel et al. | ................. 250/205 |
| 5,694,180 A | | 12/1997 | Deter et al. | |
| 2003/0011751 A1 | | 1/2003 | Sakata et al. | |
| 2005/0057557 A1 | * | 3/2005 | Kobayashi et al. | .......... 345/213 |
| 2005/0207157 A1 | * | 9/2005 | Tani | ............................. 362/244 |
| 2006/0285078 A1 | * | 12/2006 | Kasazumi et al. | ............. 353/37 |

FOREIGN PATENT DOCUMENTS

JP      2004-77549      11/2004

\* cited by examiner

*Primary Examiner*—Georgia Y Epps
*Assistant Examiner*—Francis M Legasse, Jr.
(74) *Attorney, Agent, or Firm*—Rossi, Kimms & McDowell LLP (57) ABSTRACT

An image displaying apparatus displays a color image with favorable quality on a predetermined surface. A light source unit emits light beams within different wavelength ranges optically modulated by image information. A light combining unit combines light beams from the light source unit into a light beam. A scanning unit scans a scanned surface with the light beam from the light combining unit and forms an image thereon. A controlling unit synchronously controls the scanning unit and the light source unit. A dividing unit divides a light beam into more than one light beam within an arbitrary optical path on light-incident side of the scanning unit. A receiving unit and adjustment unit adjust quantity of light emission of one or more light source units based on the light quantity received by the receiving unit on one of the optical paths divided by the dividing unit.

5 Claims, 9 Drawing Sheets

IMAGE DISPLAYING APPARATUS WITH CONTROL OVER THE OUTPUT RATIO OF A PLURALITY OF LIGHT SOURCES

BACKGROUND OF THE INVENTION

1. Field of the Invention

The present invention relates to a scanning-type image displaying apparatus for displaying images on a predetermined surface by scanning the predetermined surface with light beams which are modulated based on image information and are emitted from light source means, using scanning means.

2. Related Background Art

Conventionally, liquid crystal projectors or DLP projectors, in which a two-dimensional spatial modulator such as a liquid crystal element is illuminated with light beams from light source means such as a halogen lamp using an illuminating optical system, and light beams from the two-dimensional spatial modulator are projected onto a screen to be observed using a projection lens, are known as projection-type image displaying apparatuses.

In contrast, scanning-type image displaying apparatuses, in which a screen is scanned with laser light modulated based on image information using scanning means such as a micro-mechanical mirror and an image is displayed on the screen, are known (U.S. Publication No. 2003/0011751, Japanese Patent Application Laid-Open No. 2004-077549, U.S. Pat. No. 5,694,180).

In such a scanning-type image displaying apparatus, it is easy to downsize the entire apparatus because of the absence of an illuminating optical system. In addition, the apparatus is characterized in that, by scanning with laser light, pixel structures doesn't appear as compared to image displaying apparatuses that use two-dimensional displaying elements such as liquid crystal elements, and that it has a wide color reproduction range, so called color gamut.

Among the three patents U.S. Publication No. 2003/0011751, Japanese Patent Application Laid-Open No. 2004-077549 and U.S. Pat. No. 5,694,180, U.S. Pat. No. 5,694,180 discloses a color image projection apparatus and a conversion optical system used therein in which images are displayed using a polygon mirror and a vibrating mirror as scanning means.

In scanning-type image displaying apparatuses, a desired image is displayed by synchronizing the driving of the scanning means and the modulation of the light beam from the light source means that is optically modulated based on image information. Among such apparatuses, it is necessary in color image displaying apparatuses that display color images to control output (quantity of light emission) from light source means that radiate red, green and blue lights in order to adjust white balance.

In particular, when displaying color images using light source means that radiate red, green and blue lights, output ratio of the three-color lights becomes very important. However, no specific configurations have been disclosed regarding a method for controlling output from each light source means.

For instance, in laser beam printers that display images with laser light, semiconductor lasers are commonly used as their light source means. With laser beam printers, to automatically perform light quantity adjustment of laser light has been referred to as automatic power control (APC). To perform APC, in a CAN package of a semiconductor laser, a photodetector (monitor PD) for monitoring light quantity output is disposed in the vicinity of a laser chip which emits laser light. Thus, laser beam printers are configured so that output upon emission of laser light is fed back from an electric output value of the monitor PD to adjust light quantity.

However, there have been no disclosures regarding a ratio of output from a plurality of light source means when a plurality of light source means are used to display color images.

A scanning-type image displaying apparatus for displaying color images by scanning a scanned surface with red, green and blue laser light modulated based on image information from the plurality of light source means (laser light sources) using optical scanning means capable of performing two-dimensional scanning, and for viewing the color images does not require the use of a two dimensional displaying element such as a liquid crystal element, thereby facilitating the display of high precision color images.

However, when scanning with laser light and displaying a color image on the screen, light source means capable of emitting light quantities of red, blue and green lights at an appropriate ratio will be required. Output from a monitor PD (sensor, photo detector) within a conventional CAN package is not the output intended to actually display images. In contrast, the monitor PD can be disposed in accordance with each of the red, blue and green laser to adjust the output ratio. However, this leads to an increase in the number of parts, which in turn makes the entire apparatus more complicated.

The object of the present invention is to provide an image displaying apparatus capable of appropriately controlling an output ratio of a plurality of light source means that emit light beams (laser lights) with different wavelength ranges (red, green and blue) that are optically modulated by image information without complicating the entire apparatus, and also capable of displaying color images with favorable image quality on a predetermined surface.

SUMMARY OF THE INVENTION

According to one aspect of the invention, an image displaying apparatus comprises:

a plurality of light source means for emitting light beams with different wavelength ranges that are optically modulated based on image information;

light combining means for combining a plurality of light beams from the plurality of light source means into a single light beam;

scanning means for scanning a scanned surface with the single light beam from the light combining means and forming image information on the scanned surface;

light beam dividing means for dividing the single light beam provided along an optical path between the light source means and the scanning means into a plurality of light beams;

light receiving means for receiving light beams divided by the light beam dividing means; and controlling means for synchronously controlling the scanning means and the plurality of light source means;

wherein the apparatus includes adjustment means for adjusting a quantity of light emission of at least one light source means among the plurality of light source means based on light quantities of the light beams received by the light receiving means.

According to another aspect of the invention, an image displaying apparatus comprises:

a plurality of light source means for emitting light beams with different wavelength ranges optically modulated based on image information;

light combining means for combining a plurality of light beams from the plurality of light source means into a single light beam;

scanning means for two-dimensionally scanning a scanned surface with the light beam from the light combining means and forming image information on the scanned surface;

light beam dividing means for dividing the single light beam into a plurality of light beams, the light beam dividing means being provided along an optical path between the light source means and the scanning means;

light receiving means for receiving light beams divided by the light beam dividing means;

an optical system for guiding the single light beam from the scanning means on to the scanned surface; and controlling means for synchronously controlling the scanning means and the plurality of light source means;

wherein the apparatus has adjustment means for adjusting a quantity of light emission of at least one light source means among the plurality of light source means based on light quantities of the light beam received by the light receiving means.

According to a further aspect of the invention, in the image displaying apparatus, a first scan region in which an image is formed by scanning with a light beam by the scanning means, and a second scan region other than the first scan region exists on the scanned surface, and the adjustment means performs light quantity adjustment of the light source means wherein the quantity of light emission is adjusted based on light quantity received by the light receiving element when the scanning means is scanning the second scan region.

According to a further aspect of the invention, in the image displaying apparatus, the light combining means combines light beams from at least a first and a second light source means among the plurality of light source means into a single light beam, the light receiving means is disposed on an optical path of the combined light beam, and the adjustment means performs light quantity adjustment of the first and second light source means using a signal from the light receiving means.

According to a further aspect of the invention, in the image displaying apparatus, the controlling means controls the plurality of light source means so that light beams emitted therefrom are sequentially incident on the light receiving means at staggered timings.

According to a further aspect of the invention, an image pickup apparatus comprises an image pickup portion for taking images of an object, wherein images obtained through the image pickup portion are displayed on the image displaying apparatus set out in the foregoing.

According to the present invention, an image displaying apparatus capable of displaying a color image with favorable image quality on a predetermined surface can be obtained.

DETAILED DESCRIPTION OF THE PREFERRED EMBODIMENT

Embodiments of the present invention will now be described.

First Embodiment

Figure 1:
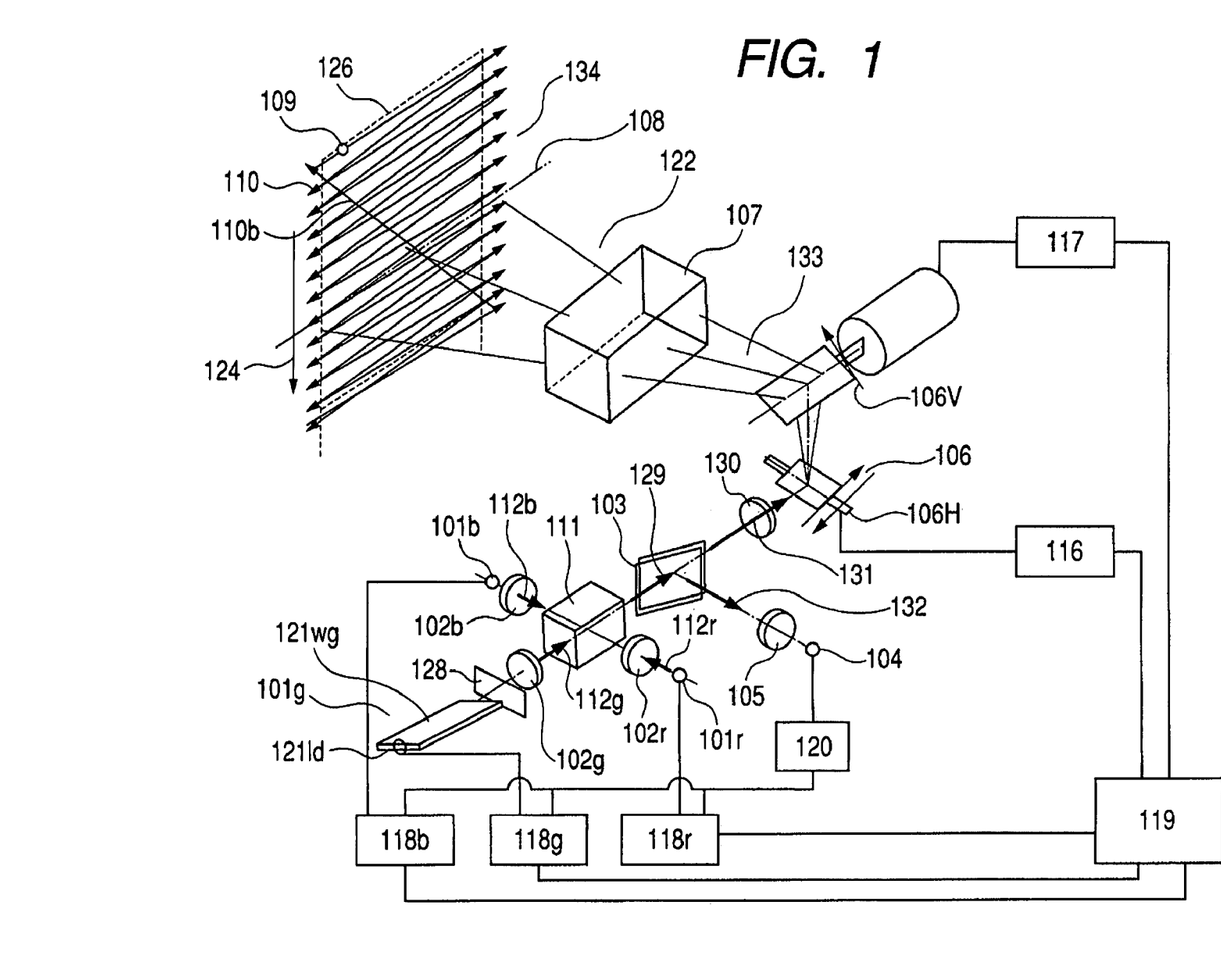
FIG. 1 is a block diagram of a light-scanning-type image displaying apparatus according to a first embodiment of the present invention.

FIG. 1 is a block diagram of a configuration of a light-scanning-type image displaying apparatus according to the present invention. In FIG. 1, reference characters 101r, 101g and 101b respectively denote light sources (light source means) that emit red, green and blue light, respectively.

The light sources 101r and 101b are semiconductor lasers. The light source 101g is a two-dimensional higher harmonic wave laser light source composed of an infrared laser 121ld and a wavelength conversion element 121wg.

The infrared laser 121ld emits infrared coherent light having a wavelength in the vicinity of 1060 nm, while the wavelength conversion element 121wg converts the infrared light to a light beam having a wavelength of 530 nm or half of the 1060 nm. Reference numeral 128 denotes an infrared cut filter that blocks infrared light.

Optical systems 102r, 102g and 102b respectively alter (convert into light beams) the light emitted from the light sources 101r, 101g and 101b so as the light beams to have a predetermined light beam diameter. Light beams having converted into beams are incident on a color combining optical system (color combining means) 111 consisting of a dichroic prism, as shown by the arrows 112r, 112g and 112b.

The red, green and blue light beams that are incident on the color combining optical system 111 are combined into a beam (light beam), which then travels towards light beam dividing means (optical path dividing means) 103 aligned in the direction of the arrow 129. The optical path dividing means 103 divides the light beam to a transmissive-side first optical path (arrow) 130 that proceeds towards scanning means 106 to display an image, and an opposite-side second optical path (arrow) 132 that proceeds towards the light receiving element 104 for performing light quantity adjustment.

The optical path dividing means 103 is configured so that the light quantity ratio of the light beams respectively directed to the first optical path 130 and the second optical path 132 is approximately 9:1 for instance. While the ratio of the light quantities of the first optical path and the second optical path is set to be approximately 9:1 in the present embodiment, the present invention is not limited to this ratio.

First, the components of the first optical path 130 will be described. The light beam traveling along the first optical path 130 is converted into condensed light via an optical system 131 and is incident on scanning means 106.

The scanning means 106 is constituted by horizontal scanning means 106H for scanning in a horizontal direction, and vertical scanning means 106V for scanning in a direction perpendicular to the scanning direction of the horizontal scanning means 106H. A scanned surface 108 is two-dimensionally scanned with the incident light beam via a scanning optical system 107 by the two scanning means 106H and 106V.

The horizontal scanning means 106H is, for instance, a resonant-type scanner configured by a semiconductor process, and both-way reciprocatingly scans the scanned surface 108 with light beams as indicated by the arrow 110 at approximately 20 kHz. The vertical scanning means 106V is vertical scanning means driven at approximately 60 Hz, and is configured so as to scan the scanned surface 108 with the incident light beams in a direction indicated by the arrow 124 in the drawing.

Light beams incident on the scanning means 106 converge on the screen (scanned surface) 108 via the optical system (scanning optical system) 107. As a result, scanning means 106 raster-scans the screen (scanned surface) 108 with a converging point 109 of the light beams from light source means 101, and forms a scanning line 110b. In FIG. 1, the scanning line 110 is thinned for better understanding. The scanning line 110b is a flyback period of the raster scan.

A first scan region 126 (indicated by the dashed line in the drawing) for displaying images to be observed by an observer, and a region comprising the rest 134 are formed on the screen 108.

The observer views an image formed on the scanned surface 108.

Next, components on the second optical path 132 will be described. The light beam traveling along the second optical path 132 converges on the light receiving element (light receiving means) 104 via an optical system 105.

The light receiving element 104 is a photo-electric transducer made of, for instance, Si, and converts the light quantity value of the incident light beam into an electrical current value. The light receiving element 104 is sensitive to red, blue and green light.

Light sources 101r, 101b and the infrared laser 121ld are electrically connected to and driven by modulating drive circuits (drivers) 118r, 118g and 118b. In addition, the drive circuits 118r, 118g and 118b are also connected to a light receiving element drive circuit (adjusting means) 120 connected to the light receiving element 104.

Furthermore, the drive circuits 118r, 118g and 118b are connected to a control circuit (control means) 119 that drives and controls the scanning means 106. Moreover, the horizontal scanning means 106H and vertical scanning means 106V are respectively electrically connected to a horizontal scanning means drive circuit 116 and a vertical scanning means drive circuit 117. In addition, the horizontal scanning means drive circuit 116 and the vertical scanning means drive circuit 117 are connected to the control means 119.

In order to display an image of a predetermined visual signal on the screen 108, the drive circuits 118r, 118g and 118b that drive the light sources 101r, 101g and 101b, and the scanning means drive circuits 116 and 117, are synchronously drive-controlled.

Figure 2:
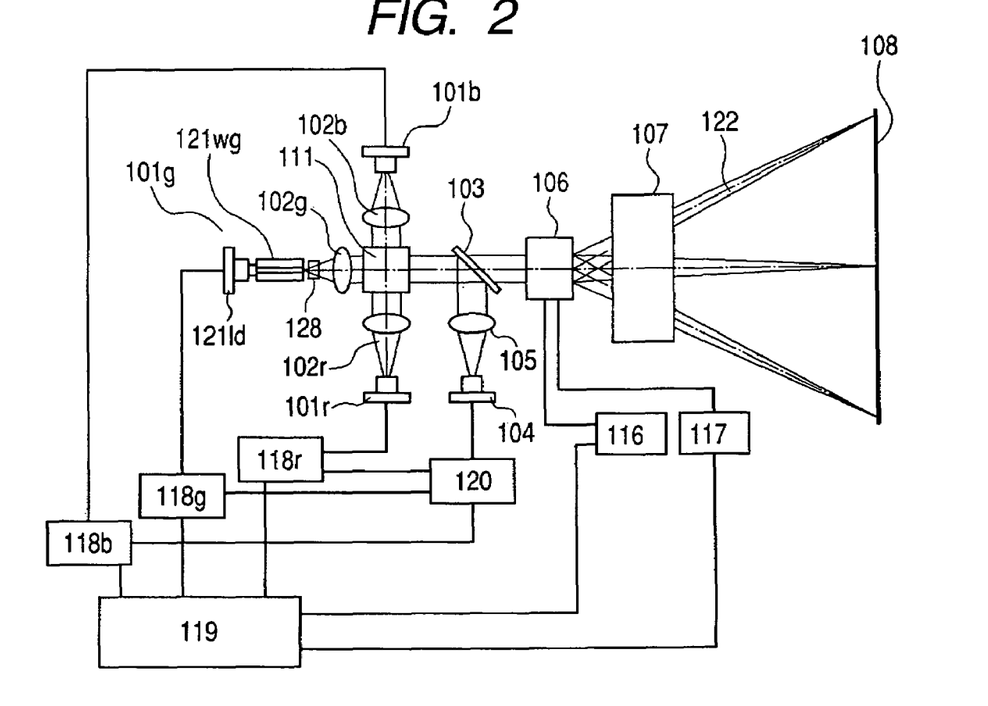
FIG. 2 is a schematic block diagram of a light-scanning-type image displaying apparatus according to the first embodiment of the present invention.

FIG. 2 is a simplified schematic block diagram showing a substantial part of FIG. 1. In FIG. 2, reference numerals same as in FIG. 1 represent the same functions in FIG. 1.

In FIG. 2, an optical path is developed and described two-dimensionally to illustrate the configuration in a simplified manner. In the following embodiments, such a form is described.

Figure 3:
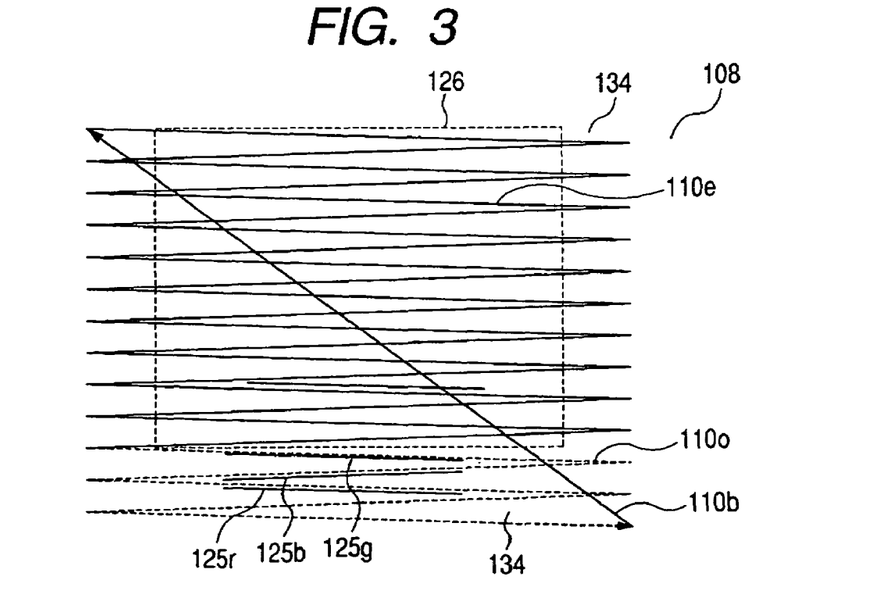
FIG. 3 is an explanatory drawing of a scan region.

FIG. 3 shows the screen 108, as well as the first scan region 126 and the second scan region 134 on the screen 108 in FIG. 1.

While FIG. 3 shows the second scan region 134 to exist on the screen 108, the actual configuration involves an aperture stop or the like disposed either in, front or rear the scanning optical system 107 to prevent light beams that are about to be incident on this region 134 from reaching the screen 108.

In FIG. 3, a scanning line 110e represents a scanning line within the first scan region 126, while a scanning line 110o is a virtual representation of a scanning line within the second scan region 134. Automatic power control (APC) of each light source means 101r, 101g and 101b is sequentially performed in each respective segment (scan segment) 125g, 125r and 125b within the second scan region 134. Reference character 110b denotes a return line (return scanning line).

Figure 4:
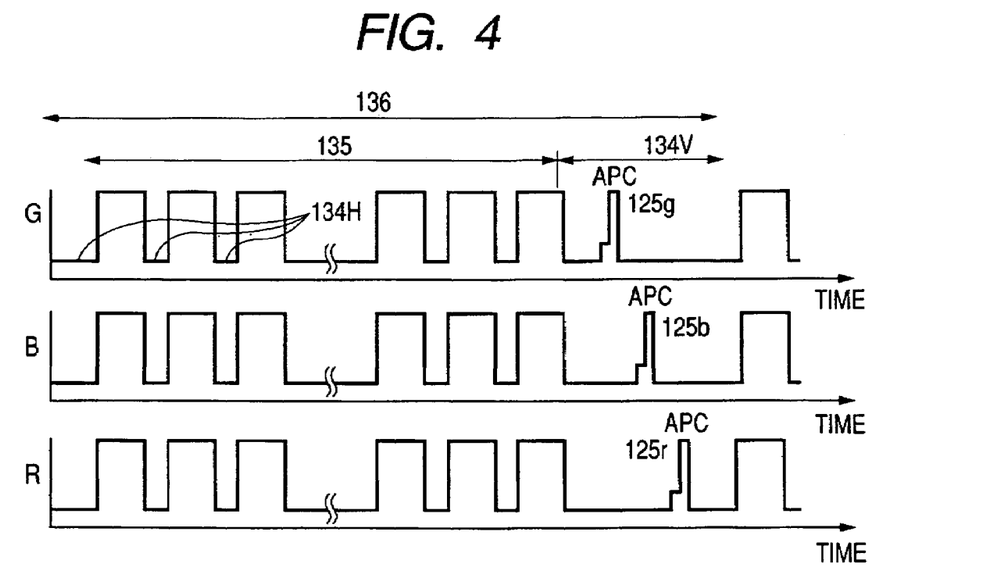
FIG. 4 is an explanatory drawing of a scan region (time)

FIG. 4 is a temporal explanatory drawing of drive signals of the light sources 101r, 101g and 101b. Segments corresponding to those in FIG. 3 are denoted by the same characters. One cycle (one frame) of vertical scanning corresponds to a time segment 136.

A time segment 135 is the area corresponding to the first scan region 126 for displaying images. A non-drawing region 134H that does not display images for each horizontal scanning period exists within the time segment 135.

Signals 125g, 125b and 125r are signals for light quantity adjustment. Light quantities for respectively driving the light sources 101r, 101g and 101b are configured based on the outputs thereof.

As shown in FIG. 4, light quantity adjustment for each light source means can be achieved by using only the one light receiving element 104 by temporally staggering the light quantity adjustment signals 125g, 125b and 125r.

Additionally, in consideration of the spectral sensitivity characteristics of the light receiving element 104, adjustment is performed based on the light quantities of the red, green and blue lights detected by the light receiving element 104 so that the ratio of each light quantity is appropriately configured.

As seen, by using one light receiving element 104, influences of error due to differences in performances and alignment among light receiving elements when a light receiving element is placed for each light source means can be avoided, thereby enabling high precision color adjustment. Furthermore, since there is only one light receiving element, it is possible to reduce the number of components.

Particularly, in the first embodiment, while a configuration of a two-dimensional higher harmonic wave laser light source configured to perform wavelength conversion of the infrared laser 121ld using the wavelength conversion element 121wg was used as the green light source 101g, the present invention is not limited to this configuration. A semiconductor laser light source that directly emits green light may be used. Similar advantages may be achieved by using light sources employing other wavelength conversion means.

Similarly, the red and blue laser light sources are not limited to semiconductor lasers, and may be configured by wavelength conversion lasers or the like, as in the case of the green laser light source.

Figure 5:
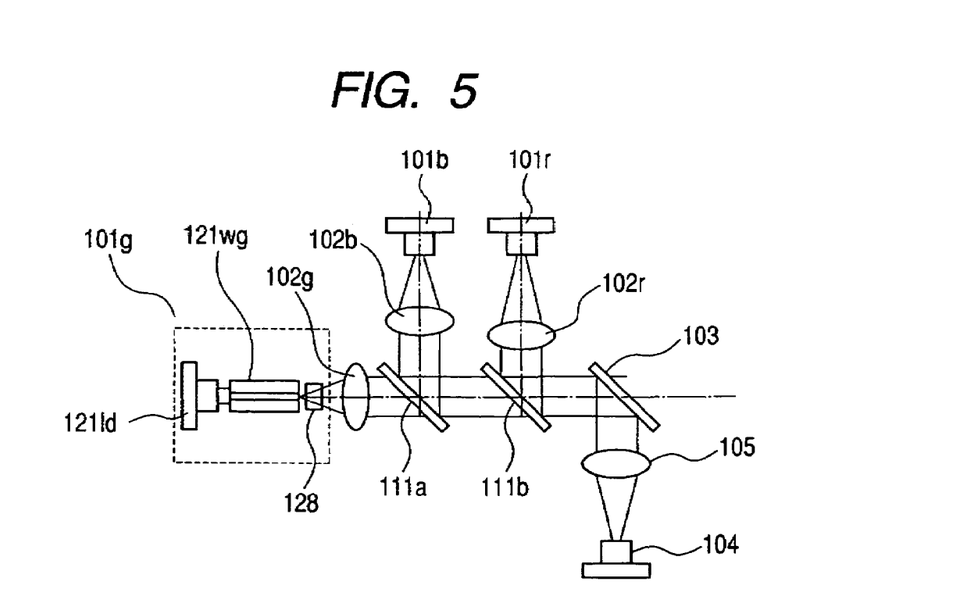
FIG. 5 is an explanatory drawing of another variation according to the first embodiment.

However the first embodiment shows an example of a configuration in which a dichroic prism is used as a color combining optical system 111, the present invention is not limited to this configuration. For instance, the color combining optical system 111 may be configured by a dichroic mirror 111a that reflects blue light while transmitting green light, and a dichroic mirror 111b that reflects red light while transmitting green and blue lights, as shown in FIG. 5.

Figure 6:
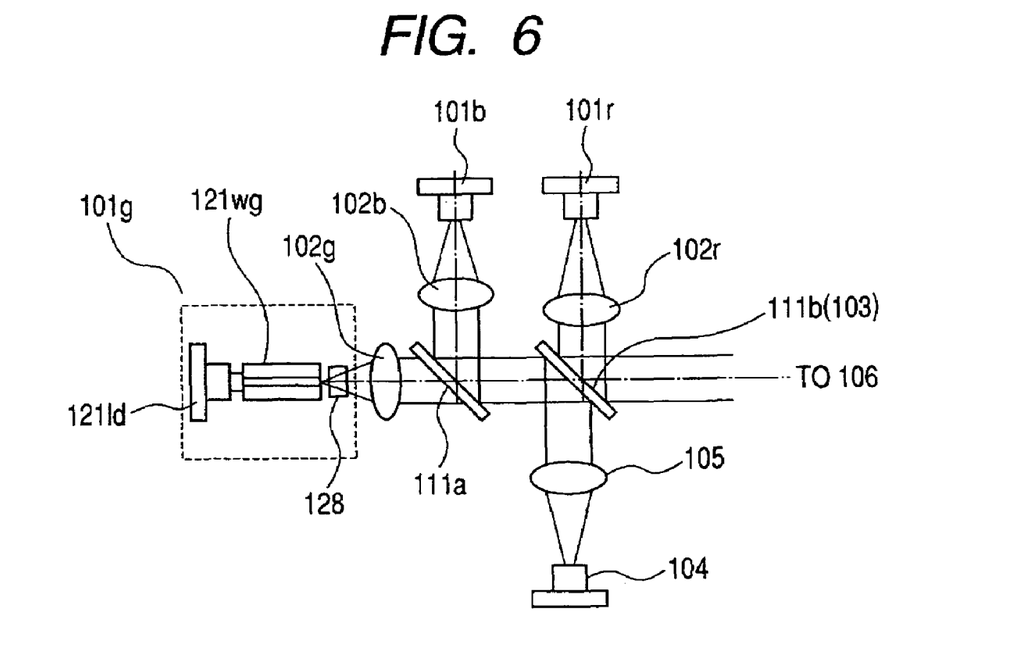
FIG. 6 is an explanatory drawing of another variation according to the first embodiment.

Furthermore, as shown in FIG. 6, the same advantages may be achieved by arranging the optical path dividing means 103 to also be used as a portion of the color combining optical system 111.

FIG. 6 is an example where the color combining means 111b is provided with the function of the optical path dividing means 103, and is configured so that a part of the light beam from the light sources 101g and 101b are reflected, while a part of the light beam from the light source 101r is transmitted to be guided to the light receiving element 104 on the second optical path 132.

Figure 7:
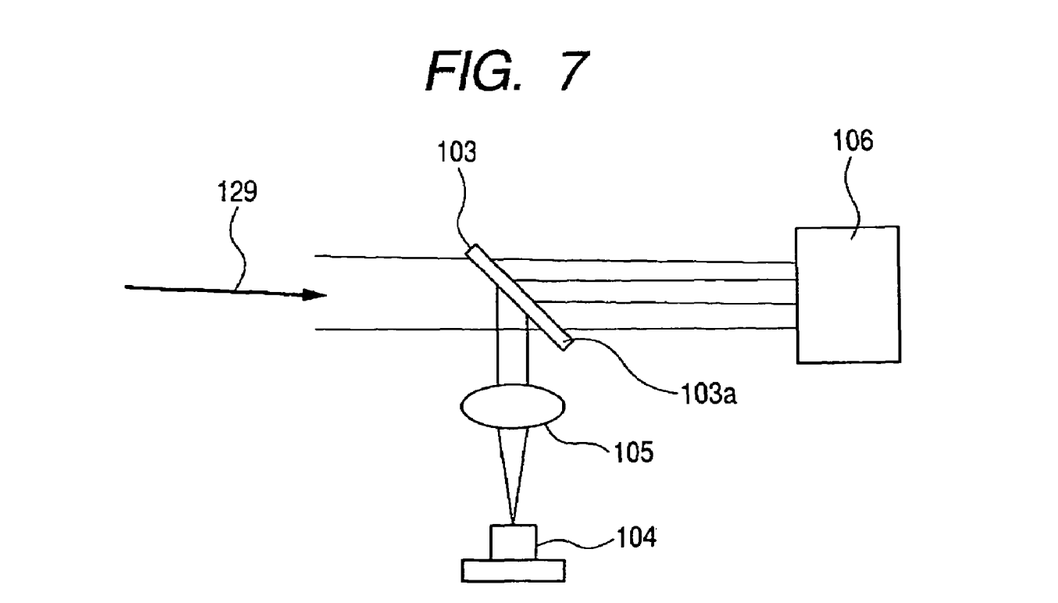
FIG. 7 is an explanatory drawing of another variation according to the first embodiment.
Figure 8:
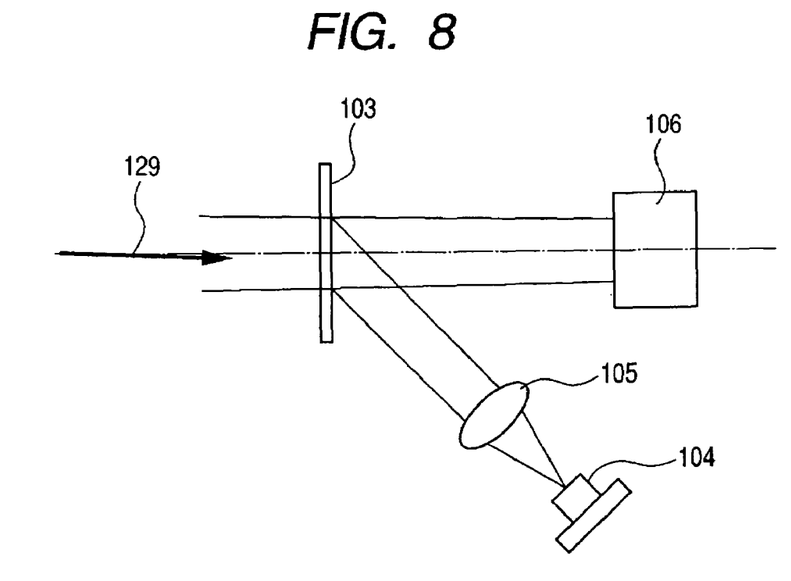
FIG. 8 is an explanatory drawing of another variation according to the first embodiment.

FIGS. 7 and 8 are explanatory drawings of other forms of the optical path dividing means in the first embodiment.

In the first embodiment, while the light beam dividing means 103 was configured so that a part of the light quantity of the light beam was extracted by reflection at the interface of a mirror, such extraction methods are not limited to reflection.

For instance, the same advantages may be achieved by a configuration wherein a given portion of light quantity is detected by extracting a part of the light beam from an aperture 103a, as shown in FIG. 7.

In addition, the same advantages may be achieved by configuring the light beam dividing means 103 using a diffraction optical element or a hologram element to guide transmitted light of various angles to the light receiving element 104, as shown in FIG. 8.

In FIG. 8, while the light beam dividing means 103 was configured to guide transmitted light to the optical receiver 104, the present invention is not limited to this configuration, and the same advantages may be achieved by a configuration in which the division is performed as reflected light.

In the present embodiment, while the output from the light receiving means was connected to the respective light source drive means 118r, 118g and 118h, the present invention is not limited to this configuration. The same advantages may be achieved by connecting the output from the light receiving means 104 to the controlling means 119, and performing control based thereon.

In the present embodiment, while a laser light source was used as a light source, the present invention is not limited to this configuration. For instance, a light emitting diode (LED) may be used.

Second Embodiment

A second embodiment of the present invention will now be described.

Figure 9:
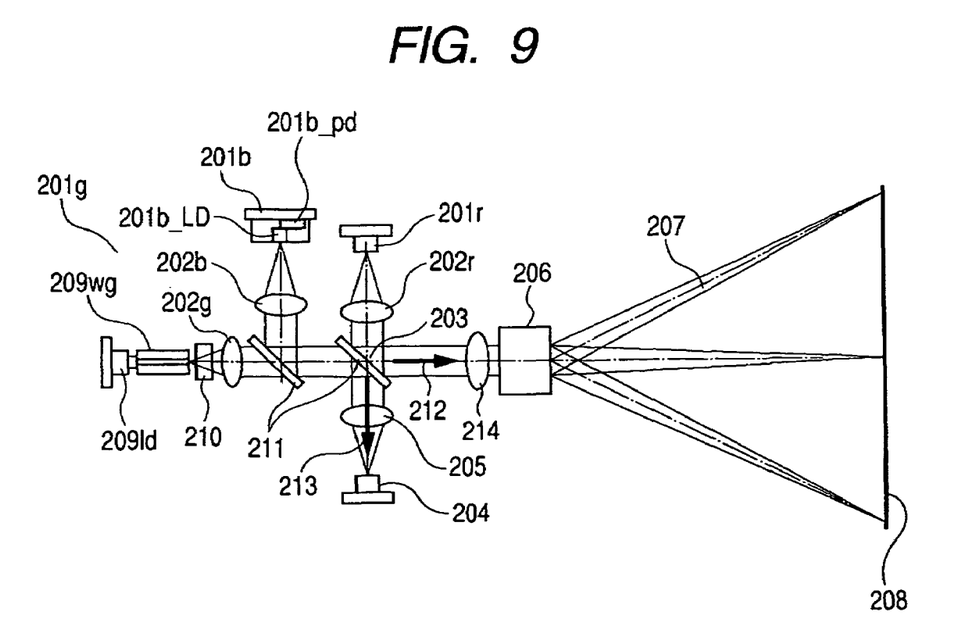
FIG. 9 is a schematic block diagram of a light-scanning-type image displaying apparatus according to a second embodiment of the present invention.

FIG. 9 is a schematic block diagram of a light-scanning-type image displaying apparatus of the present invention that has been simplified in the same manner as in FIG. 2.

In FIG. 9, light sources 201r, 201g and 201b are laser light sources that respectively emit red, green and blue light.

The light sources 201r and 201b are semiconductor lasers. The semiconductor laser 201b is configured to have a built-in package consisting of a laser light source 201b_LD and a light receiving element 201b_pd for monitoring light quantities.

The light source 101g is a two-dimensional higher harmonic wave laser light source composed of an infrared laser 209ld and a wavelength conversion element 209wg. The infrared laser 209ld emits infrared light having a wavelength in the vicinity of 1060 nm, while the wavelength conversion element 209wg converts the infrared light to a light beam having a wavelength of 530 nm, or half of the 1060 nm wavelength.

Reference numeral 210 denotes an infrared cut filter that cuts infrared laser light.

The optical systems 202r, 202g and 202b respectively convert light beams emitted from the light sources 200r, 200g and 200b into beams having a predetermined light beam diameter. Light beams converted into beams are incident on a color combining optical system (combining optical system) 211 consisting of a dichroic mirror.

The red, green and blue light beams that are incident on the color combining optical system 211 are combined into single light beam that travels in the direction of the arrow 212.

The optical path dividing means 203 is configured and aligned to also function as the color combining means 211. The optical path dividing means 203 divides a light beam to a transmissive-side first optical path 212 along which light beam is guided towards scanning means 206 to display an image, and an opposite-side second optical path 213 that along which light beam is guided towards a light receiving element 204 for performing light quantity adjustment.

In the second embodiment, the optical path dividing means 203 is configured so that the light quantity ratio of the light beams respectively directed to the first optical path 212 and the second optical path 213 is approximately 9:1. While the light quantity ratio of the light beams respectively directed to the first and second optical paths is set to be approximately 9:1 in the present embodiment, the present invention is not limited to this ratio.

First, the components of the first optical path 212 will be described. The light beam of the first optical path 212 is converted into condensed light via an optical system 214 and is incident on the scanning means 206. Similar to that shown in FIG. 1, the scanning means 206 includes horizontal scanning means for scanning in a horizontal direction, and vertical scanning means for scanning in a direction perpendicular to the scanning direction of the horizontal scanning means.

A screen (scanned surface) 208 is two-dimensionally scanned with the incident light beam 207 by the two scanning means.

At this point, the scanning means 206 and the light sources 201r, 201g and 201b are synchronously drive-controlled to display a desired image on the screen 208.

Next, components of the second optical path 213 will be described. The light beams traveling along the second optical path 213 converge on the light receiving element (light receiving means) 204 via an optical system 205. The light receiving element 204 is a photo-electric transducer made of, for instance, Si (silicon), and converts the light quantity value of the incident light beam into an electrical current value. The light receiving element 204 is sensitive to red, blue and green wavelengths.

Displaying of images in the second embodiment is performed in the same way as in the first embodiment.

Figure 10:
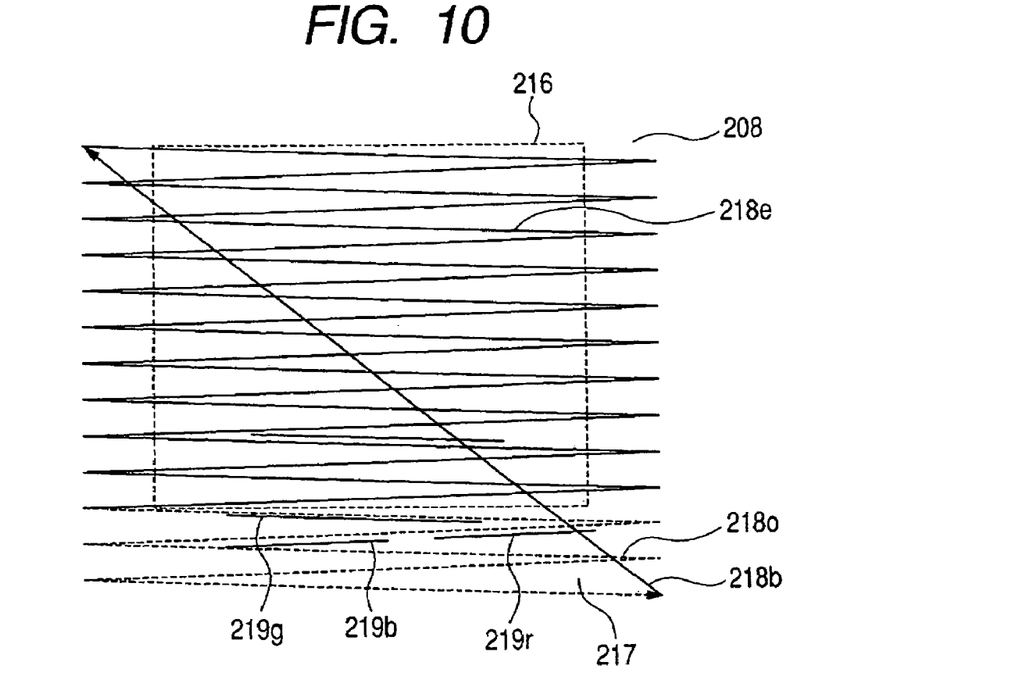
FIG. 10 is an explanatory drawing of a scan region.

FIG. 10 shows a first scan region 216 and a second scan region 217 on the screen 208.

While FIG. 10 shows the second scan region 217 to exist on the screen 208, the actual configuration involves an aperture stop or the like disposed in the vicinity of the scanning means to prevent light beams in this region from reaching the screen 208.

A scanning line 218e represents a scanning line within the first scan region 216, while a scanning line 218o is a virtual representation of a scanning line within the second scan region 217.

In the scanning line 218o segment within the second scan region 217, automatic power control (APC) of each light source 201r and 201g is sequentially performed in each respective segment (scan segment) 219g and 219r. Reference character 218b denotes a return scanning line.

In the configuration of the present embodiment, the light quantities of the light sources 201g and 201r are adjusted based on output of the light receiving element 204 which are caused by the light beam incident thereon, and the light quantity of the light source 201b is adjusted based on output from a monitor PD 210b_pd. In addition, overall brightness and color (white) balance is set to a predetermined value by adjusting the ratio of outputs among the respective light sources 201r, 201g and 201b based on the light quantity of light beams from the light sources 201g and 201r at the light receiving element 204.

In the second embodiment, some laser light sources have built-in monitor PDs, whereby such monitor PDs are used. In such a configuration of the second embodiment, light quantity divided by the optical path dividing means 203 is combined with results obtained by the light receiving element 204.

The optical path dividing means 203 and the light receiving element 204 are arranged so as to enable to monitor light quantities radiated from a plurality of light sources by a light receiving element 204 as described above, thereby enabling the number of components reduced.

In the second embodiment, by arranging the light receiving element 204 so that light beams from the light sources 201g and 201r can be received, the ratio of output from the light sources 201g and 201r is set at a predetermined value.

Figure 11:
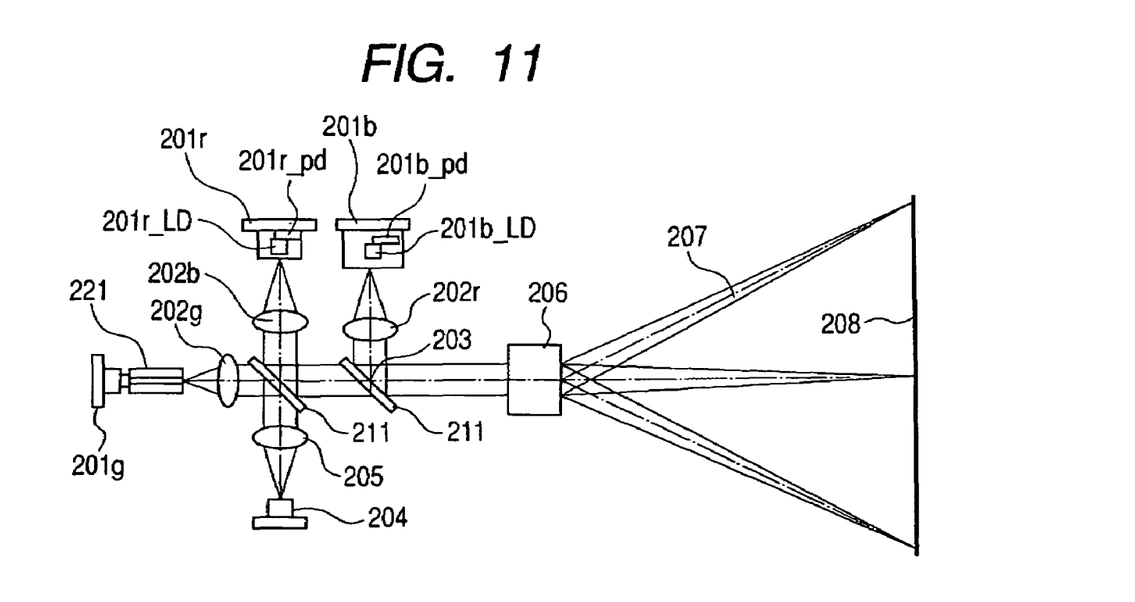
FIG. 11 is an explanatory drawing of another variation of the second embodiment.

In addition, in the second embodiment, the light receiving means 204 and the other components can be configured to be rearranged at the positions shown in FIG. 11 so that light beams radiated from at least two light source means 201r and 201g can be received by a single light receiving element 204. This will be effective in reducing the number of components.

Particularly, in the second embodiment, the green light source 201g is configured by a two-dimensional higher harmonic wave laser in which infrared laser beam emitted from the infrared laser 209ld is wavelength-converted by the wavelength conversion element 209wg. When using such two-dimensional higher harmonic wave lasers, it is necessary to control output of wavelength-converted light. Therefore, it is effective to use the light receiving element that receives output of wavelength-converted light also to receive light beams from other light sources.

Incidentally, the second embodiment is not limited to this configuration. A laser light source that directly emits green light may be used. Similar advantages may be achieved by using a plurality of light sources using wavelength conversion means.

Third Embodiment

A third embodiment of the present invention will now be described.

Figure 12:
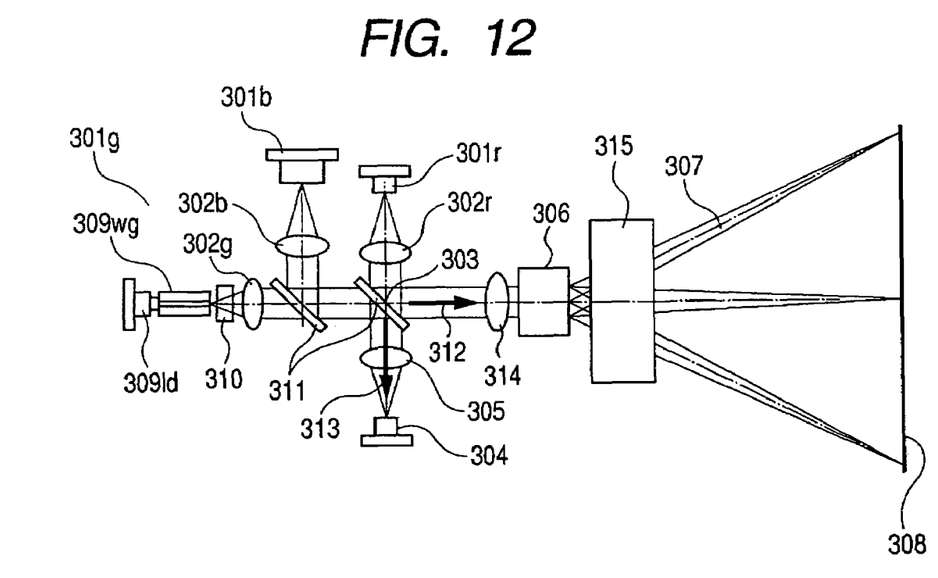
FIG. 12 is a schematic block diagram of a light-scanning-type image displaying apparatus of a third embodiment of the present invention.

FIG. 12 is a schematic block diagram of a light-scanning-type image displaying apparatus of the present invention that has been simplified in the same way as in FIG. 2.

In FIG. 12, light sources 301r, 301g and 301b are laser light sources that respectively emit red, green and blue light.

The light sources 301r and 301b are semiconductor lasers. The light source 301g is a two-dimensional higher harmonic wave laser light source composed of an infrared laser 309ld and a wavelength conversion element 309wg.

The infrared laser 309ld emits infrared light having a wavelength of in the vicinity of 1060 nm, while the wavelength conversion element 309wg converts the infrared light to a light beam having a wavelength of 530 nm, or half of the 1060 nm wavelength. Reference numeral 310 denotes an infrared cut filter that blocks infrared laser light.

The optical systems 302r, 302g and 302b respectively convert light beams emitted from the light sources 301r, 301g and 301b into beams of a predetermined light beam diameter. Light beams converted into the beams are incident on a color combining optical system (combining optical means) 311 consisting of a dichroic mirror.

The red, green and blue light beams that are incident on the color combining optical system 311 are combined into a light beam that travels in the direction of the arrow 312. Optical path dividing means 303 is configured and aligned to also possess functions of color combining means 311. The optical path dividing means 303 divides a light beam into a transmissive-side first optical path 312 along which light travels towards scanning means 306 to display an image, and an opposite-side second optical path 313 along which light travels towards a light receiving element 304 for performing light quantity adjustment.

In the third embodiment, it is configured that the light quantity ratio of the light beams respectively directed to the first optical path 312 and the second optical path 313 is a predetermined ratio.

First, the components of the first optical path 312 will be described. The light beam of the first optical path 312 is converted into condensed light via an optical system 314 and is incident on the scanning means 306. The scanning means 306 is constituted by horizontal scanning means for scanning in a horizontal direction similar to that shown in FIG. 1, and vertical scanning means for scanning in a direction perpendicular to the scanning direction of the horizontal scanning means.

A screen (scanned surface) 308 is then two-dimensionally scanned with the incident light beam 307 by the scanning means 306 and an optical system 315.

At this point, the scanning means 306 and the light sources 301r, 301g and 301b are synchronously drive-controlled to display a desired image on the screen 308.

Next, components of the second optical path 313 will be described. The light beam of the second optical path 313 converges on the light receiving element (light receiving means) 304 via an optical system 305. The light receiving element 304 is a photo-electric transfer element (photo detector) comprised of, for instance, Si (silicon), and converts the light quantity value of the incident light beam into an electrical current value. The light receiving element 304 is sensitive to red, blue and green wavelengths.

Displaying of images in the third embodiment is performed in the same way as in the first embodiment.

Figure 13:
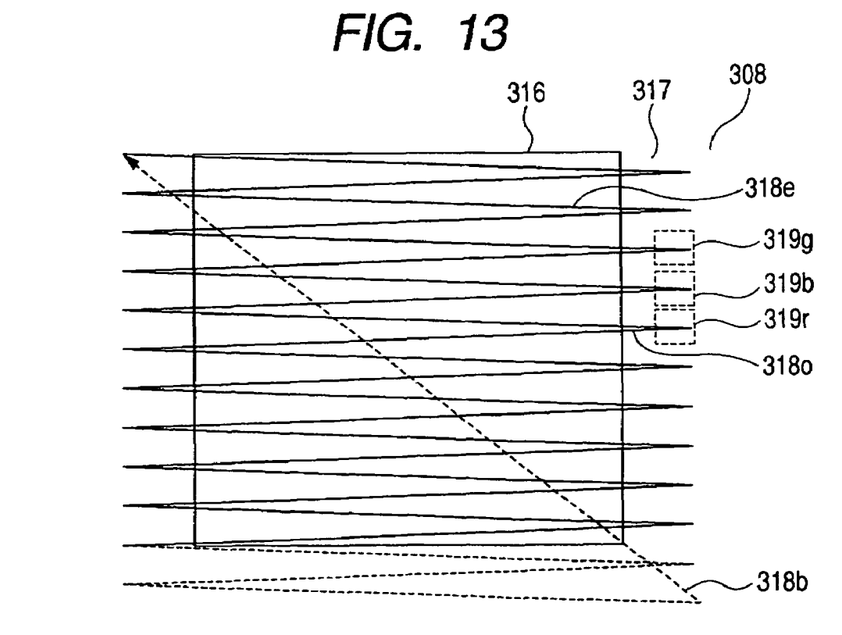
FIG. 13 is an explanatory drawing of a scan region.

FIG. 13 shows a first scan region 316 and a second scan region 317 on the screen 308.

While FIG. 13 shows the second scan region 317 to exist on the screen 308, the actual configuration involves an aperture stop or the like disposed in the vicinity of the scanning means to prevent light beams in this region from reaching the screen 308.

A scanning line 318e represents a scanning line within the first scan region 316. A scanning line 318o is a virtual representation of a scanning line within the second scan region 317. In the scanning line 318o segment (scan segment) within the second scan region 317V, the automatic power control (APC) of light sources 301r, 301g and 301b is performed in the respective segments (scan segment) 319g, 319r and 319b. Reference character 318b denotes a return scanning line.

In addition, color (white) balance is set to a predetermined value by adjusting the ratio among outputs of light source means 301*r*, 301*g* and 301*b* based on the light quantity of light beams received at the light receiving element 304.

In this manner, by configuring the light quantities of a plurality of light sources 301*r*, 301*g* and 301*b* to be monitored by a single light receiving element 304, the number of components may be reduced.

Additionally, in the third embodiment, by arranging the light receiving element 304 so as to receive light beams from the light sources 301*r*, 301*g* and 301*b*, the ratio of output from the light sources 301*r*, 301*g* and 301*b* is set at a predetermined value.

The green light source 301*g* is a second harmonic generation laser source configured to perform wavelength conversion of the infrared laser 309*ld* using the wavelength conversion element 309*wg*. When using such second harmonic generation lasers, it is necessary to control output of wavelength-converted light. Therefore, it is effective to use the light receiving element, which receives output of wavelength-converted light also to receive light beams from other light sources. However, the third embodiment is not limited to this configuration. A laser light source that directly emits green light may be used. Similar advantages may be achieved by using a plurality of light sources employing wavelength conversion means.

Figure 14:
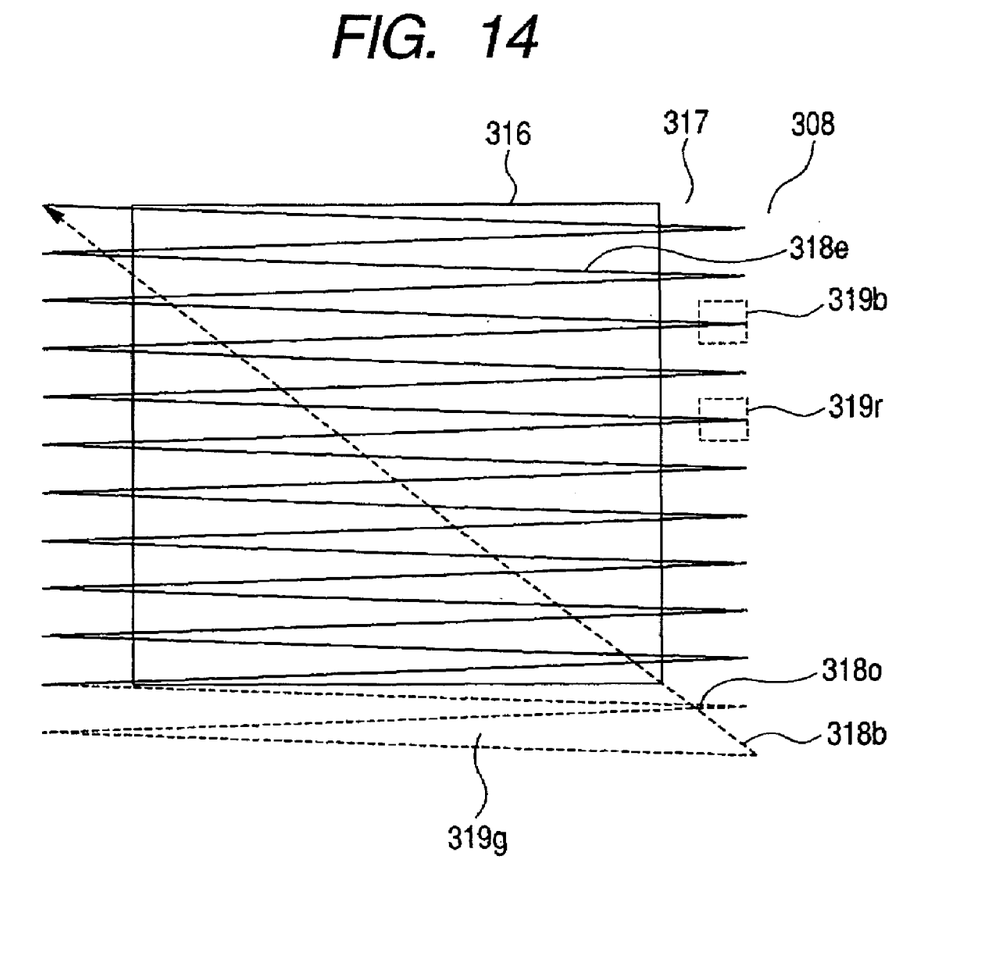
FIG. 14 is an explanatory drawing of another variation of a scan region.

In the third embodiment, while a second scan region 317 that does not display primary scan direction images was described as a region for performing light quantity adjustment, the present invention is not limited to this configuration. The same advantages may be achieved by using any region other than the first scan region 316. For instance, light quantity adjustment may be performed in regions of the segments (scan segments) 319*r*, 319*g* and 319*b*, as shown in FIG. 14.

Moreover, while the present embodiment describes light quantity adjustment to be performed once for each light source within one frame duration, the present invention is not limited to this configuration.

Fourth Embodiment

Figure 15:
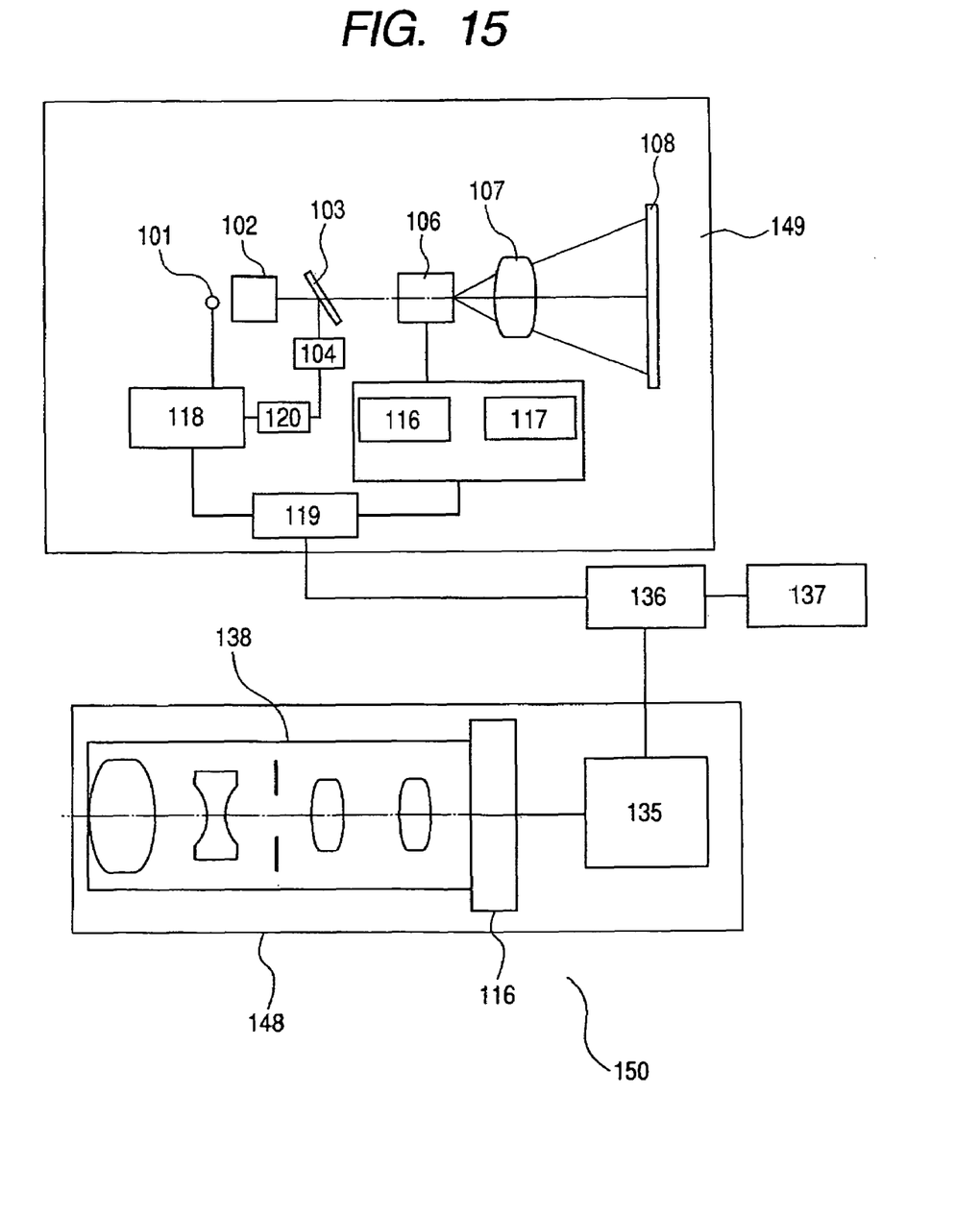
FIG. 15 is a schematic diagram of the third embodiment of the present invention.

FIG. 15 is a schematic block diagram of a substantial part of an image pickup apparatus (camcorder) 150 such as a video camera using a scanning-type image displaying apparatus according to a fourth embodiment of the present invention. A member in FIG. 15 same as in FIG. 1 will be referred to with the same reference numeral used in FIG. 1. An image display portion 149 is composed of a scanning-type image displaying apparatus presented in the first to third embodiments.

In the fourth embodiment, an image pickup portion 148 is configured to normally capture moving images, and record them in a storage portion (not shown). An interface portion 137 operable by an observer is connected to a device control circuit 136. Besides moving images, the camcorder of the fourth embodiment is configured to be also capable of recording still images into the storage portion, not shown, and the observer can perform such configuration via the interface portion 137. Reference numeral 138 denotes a photographing system such as a zoom lens.

When photographing moving images or still images, the image capturing is performed by an image pickup element 116 in the image pickup portion 148. Reference numeral 135 denotes a drive circuit for the image pickup element 116.

Control means 119 controls driving of light source means 101 based on signals from the device control circuit 136, or in other words, image information.

The observer observes an image on the scanned surface 108 of the display portion 149 either by directly observing the scanned surface 108, or by observing the scanned surface 108 as a virtual image using an eyepiece optical system, not shown. As seen, the fourth embodiment provides an image pickup apparatus capable of displaying color images of optimum image quality to an observer.

In the first to third embodiments, among the scanning means, a micromechanical mirror formed through a semiconductor process and configured so that the mirror surface swings due to a mechanical resonance motion can be used as the horizontal scanning means 106H, 206H and 306H. Scanning means that are compact and capable of high-speed scanning can be achieved through the use of micromechanical mirrors.

The vertical scanning means 106V, 206V and 306V can be configured by a galvanometer mirror in which a mirror is attached to a rotating shaft of a stepping motor, DC brushless motor or the like. The same advantages may be achieved by configuring a device to have the functions of the horizontal and vertical scanning means.

In addition, according to the embodiments, in the image displaying apparatuses which that display images on a screen by scanning with light beams radiated from a plurality of light sources, light quantity adjustment on the light beam of each light source can be performed by using fewer light receiving elements at higher precision.

Moreover, according to the embodiments, it is possible to directly measure light quantity of light beams for displaying images, thereby allowing high precision light quantity adjustment. Also, since an optical path dividing means is disposed before beam-converted light beams are incident on scanning means, influence due to the position of the scanning means can be negated.

Furthermore, since light quantity adjustment of the scanning means is performed based on light quantities of the light beams that are incident on the light receiving means during scanning of the second scan region, no light beam from each light source means is incident on the first scan region on which images are displayed during light quantity adjustment, resulting in the formation of preferable images.

By configuring light quantity information, which is used to perform light quantity adjustment of light source means either for dichroic light or for red, blue and green light, to be obtained from light receiving means over different timing, light quantity adjustment of two or three light source means can be performed by a single light receiving means.

This application claims priority from Japanese Patent Application No. 2005-139752 filed on May 12, 2005, which is hereby incorporated by reference herein.

What is claimed is:

1. An image displaying apparatus comprising:
a plurality of light source units for emitting light beams within wavelength ranges different from each other that are modulated based on image information;
a light combining unit for combining a plurality of light beams from the plurality of light source units into a single white light beam;
a scanning unit for scanning a scanned surface with the single white light beam from the light combining unit and forming image information on the scanned surface;
a light beam dividing unit, provided along an optical path between the light combining unit and the scanning unit, for dividing a single light beam into a plurality of light beams;
a light receiving unit for receiving a beam divided by the light beam dividing unit;
a controlling unit for synchronously controlling the scanning unit and the plurality of light source units, wherein the controlling unit controls the plurality of light source units so that light beams emitted therefrom are sequentially incident on the light receiving unit at sequential timings or at different timings; and an adjustment unit for adjusting a quantity of light emission of at least one light source unit among the plurality of light source units based on light quantities of the light beams received by the light receiving unit, wherein the light receiving unit is configured to receive light beams from a red light source unit and a green light source unit among the plurality of light source units but not a blue light beam from a blue light source unit among the plurality of light source units, wherein the light combining unit includes:

a first dichroic mirror which reflects a part of light beam from the red light source unit and transmits a part of light beam from the green light source unit; and a mirror which transmits the light beam from the red light source unit which has been reflected on the first dichroic mirror and the light beam from the green light source unit which has been transmitted through the first dichroic mirror, and reflects the light beam from the blue light source unit, wherein the light beam dividing unit includes the first dichroic mirror, wherein the light receiving unit is configured to sense the light beam from the red light source unit which has been transmitted through the first dichroic mirror and the light beam from the green source unit which has been reflected on the first dichroic mirror.

2. The image displaying apparatus according to claim 1, wherein a first scan region in which an image is formed by scanning with a light beam by the scanning unit, and a second scan region other than the first scan region exists on the scanned surface, and the adjustment unit performs light quantity adjustment of the at least one light source unit, wherein the quantity of light emission is adjusted based on light quantity received by the light receiving element when the scanning unit scan the second scan region.

3. The image displaying apparatus according to claim 1, wherein the light combining unit combines light beams from at least first and second light source units among the plurality of light source units into a single combined light beam, the light receiving unit is disposed on an optical path of the single combined light beam, and the adjustment unit performs light quantity adjustment of the first and second light source units using a signal from the light receiving unit.

4. An image pickup apparatus, wherein an image obtained through an image pickup portion that pickups images of an object is displayed on the image displaying apparatus according to claim 1.

5. The image displaying apparatus according to claim 1, wherein the green light source unit comprises an infrared light source unit configured to emit infrared light and a wavelength conversion element configured to perform wavelength conversion from the infrared light emitted form the infrared light source unit to green light.

* * * * *